Dec. 25, 1923.　　　　　　　　　　　　　　　　　　1,478,517
H. HIGHAM
MOTOR SCRAPER
Filed April 7, 1921　　　3 Sheets-Sheet 1
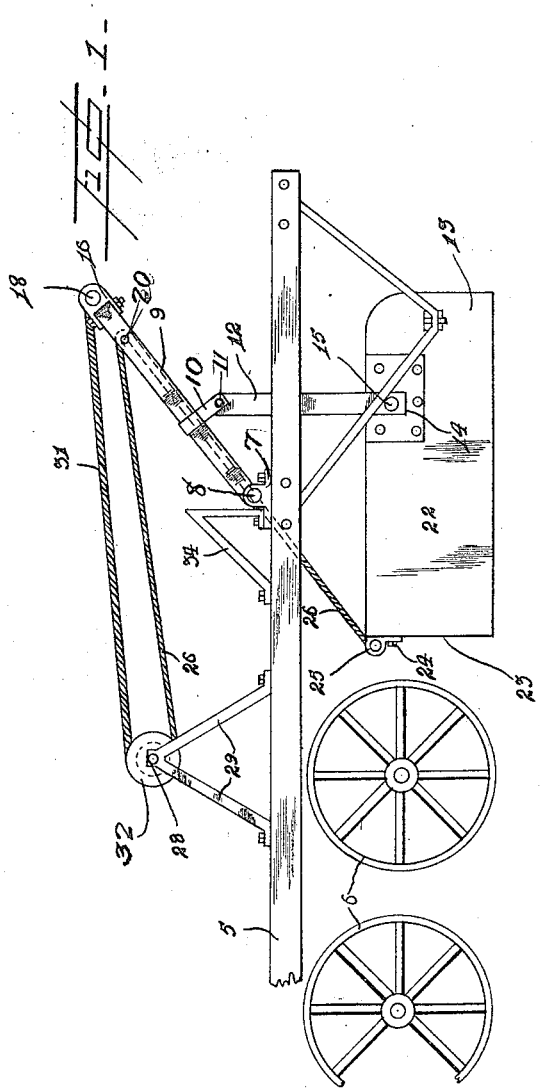
HARRY HIGHAM
INVENTOR
BY E. M. Bond
ATTORNEY Dec. 25, 1923.
H. HIGHAM
MOTOR SCRAPER
Filed April 7, 1921
1,478,517
3 Sheets-Sheet 2
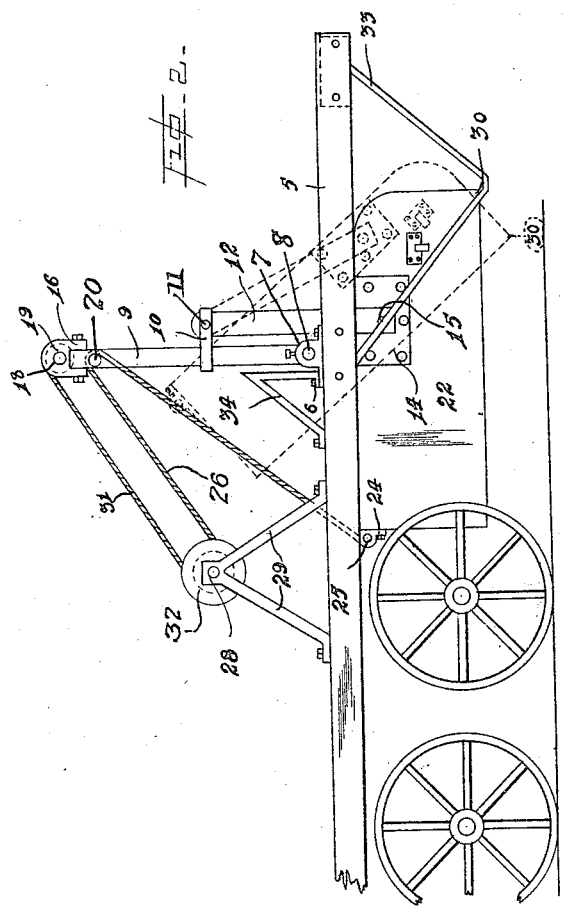
HARRY HIGHAM
INVENTOR
BY E. M. Bond
ATTORNEY

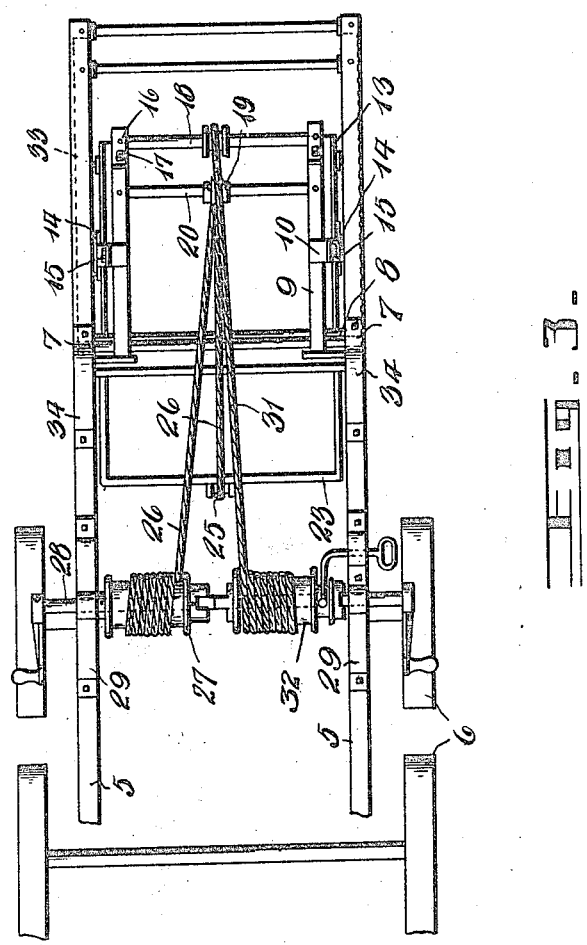

Patented Dec. 25, 1923.

1,478,517

UNITED STATES PATENT OFFICE.

HARRY HIGHAM, OF FENWOOD, SASKATCHEWAN, CANADA.

MOTOR SCRAPER.

Application filed April 7, 1921. Serial No. 459,497.

*To all whom it may concern:*

Be it known that I, HARRY HIGHAM, a citizen of the Dominion of Canada, residing at Fenwood, in the county of Saltcoats and Province of Saskatchewan, have invented certain new and useful Improvements in Motor Scrapers, of which the following is a specification.

The present invention relates to improvements in road scrapers and more particularly pertains to apparatus of this character which is motor propelled.

The principal object of the invention is to provide a scraping machine, which is capable of operation to level the road and to convey the earth excavated and dump the same.

A further object is to provide a scraping apparatus which may be operated by a single operator and wherein the scoop may be held in elevated position after the scraping operation and during the conveying period.

With these and other objects in view, the invention consists in the construction, combination and arrangement of parts as will be hereinafter fully described, illustrated in the accompanying drawings, and pointed out in the claims hereunto appended.

Figure 1 is an elevational view of a part of the extension frame of the motor scraper, illustrating the essential elevating, suspension and lowering mechanism for the scoop, with the latter in operative position.

Fig. 2 is a similar view of the same with the scoop in suspended position and

Fig. 3 is a top plan with the parts as shown in Figure 1.

Referring to the drawings like numerals designate like parts in the various drawings.

In the drawings the numeral 5, designates the extension of a motor vehicle or tractor chassis supported upon the wheels 6. The driving mechanism for the apparatus has not been illustrated, as the improvements are adapted for connection to the ordinary motor vehicle chassis, or the same may form a part of a specially built propulsion apparatus driven by the usual explosive engine.

Mounted on the forward part of the extension beams 5 and secured thereto by the bolts 6 are the bearing members 7 in which is journaled the transverse shaft 8. Secured to said shaft 8 at each side of the apparatus beams 5, are the lever bars 9 to which the straps 10 are secured. These straps 10 have pin connections 11 with the upper ends of the bars 12. A rectangular scoop 13 is provided adjacent its forward end with plates 14 on which are formed the studs 15. These studs 15 are received within openings in the lower ends of the bars 12, whereby the said scoop is supported below the vehicle frame. Mounted upon the upper ends of the lever bars 9 are the bearing cap members 16, through which pass the bolts 17 for detachably securing the said cap members 16 to the lever bars 9. Shafts 18 have their ends journaled in the cap members 16 and carries a roller 19. A similar shaft 20 is journaled below the cap members 16 in the upper ends of the lever bars 9.

The scoop 13 is preferably constructed of sheet metal having a base, side walls 22, and a closed end wall 23. Secured by bolts 24 to the closed end wall 23 of the scoop is the plate 25 to which is secured the lower end of the cable 26.

This cable 26 is trained over the shaft 20 in lever bars 9 and is wound around the drum 27 on shaft 28 in the uprights 29. These uprights 29 are bolted to the extension beams 5 and shaft 28 and any convenient means may be provided by means of which motion is imparted to the drum for actuating the cable 26. When it is desired to lower the scoop 13 as illustrated in Fig. 1, the drum 27 is allowed to run free which slackens up on the cable 26, so that the lever bars 9 are lowered. When it is desired to elevate the scoop the drum is actuated in the opposite direction and consequently the lever bars 9 will assume upright positions as illustrated in Fig. 2.

As will be understood, the apparatus will be moved under its own motive power over the road surface and will resultantly push the scoop 13 forwardly so that the relatively sharp edge 30 of the bottom of the scoop, at its open front end, will bite upon the earth. The earth so broken or scraped will pass rearwardly into the scoop as the machine advances. When the scoop is filled the cable 26 is tightened by actuating drum 27, which action will cause the lever bars 9 to assume the position illustrated in Fig. 2, that is to assume true vertical positions. In this position the scoop 13 containing a full load of earth is suspended above the road bed and then the engine is started and the earth is conveyed to the proper dumping place.

A cable 31 has one end wound upon the drum 32 and passes over the roller 19 on shaft 18 and its opposite end is secured to a plate similar to plate 25 at the rear closed end of the scoop 13. When the scoop 13 is in elevated or suspended position and it is desired to tilt the same to dump the earth, as illustrated in Fig. 2 in dotted lines, the drum 27 is revolved which draws upon cable 26 and resultantly the inner closed end of scoop 22 is elevated and the earth will pour out.

The transverse movement of the scoop 13 regulated by the triangular guide bars 33, secured to the lower edge surfaces of the extension beams 5, while the movement in one direction of the lever bars 9 is regulated by the stop members 34 secured to the upper edge portion of the extension beams 5.

By the provision of the toggle supporting elements for the scoop 13, comprising the lever bars 9, links 10 and bars 12 the said scoop is normally held in even horizontal plane, so that the earth is not spilled from the scoop, during the conveying operation.

It is obvious that the drums on shaft 28 may be provided with suitable clutches, so that they may be easily actuated for operating the cables 26 and 31 for their proper function.

Likewise, the elevating, dumping and lowering of the scoop may be accomplished by power from the propulsion engine.

In operation the driver would take his position upon the frame facing the scoop 13 and the apparatus would be moved forward and the scoop lowered. Upon the filling of the scoop, the same would be elevated and then the machine would be reversed to deliver the earth to a point of discharge. The other cable 31 is then wound upon the drum 32, which action causes the end of the scoop to be elevated or tilted so that the earth therein would slide out.

In the manner the surfaces of the roads will be scraped and evened up and the earth so removed would be dumped into the hollows.

From the foregoing it is thought that the construction of my invention will be clearly understood, and, therefore, a more extended explanation has been omitted.

Having thus described the invention, what I claim is:—

1. In an earth scraper, a wheel-supported frame, a transverse shaft journaled therein, lever bars secured to opposite ends of said shaft, straps secured to said bars between the ends of the latter, a scoop, bars pivotally supported from said straps and pivotally connected with the scoop to one side of its longitudinal centre whereby said scoop is pivotally mounted for dumping, and a cable attached at one end to one end of the scoop and over said lever bars.

2. In an earth scraper, a wheel-supported frame, a transverse shaft journaled therein, lever bars secured to opposite ends of said shaft, straps secured to said bars between the ends of the latter, a scoop, bars pivotally supported from said straps and pivotally connected with the scoop to one side of its longitudinal centre whereby said scoop is pivotally mounted for dumping, a cable attached at one end to one end of the scoop and over said lever bars, and a winding drum for said cable.

3. In an earth scraper, a wheel-supported frame, a transverse shaft journaled therein, lever bars secured to opposite ends of said shaft, straps secured to said bars between the ends of the latter, a scoop, bars pivotally supported from said straps and pivotally connected with the scoop to one side of its longitudinal centre whereby said scoop is pivotally mounted for dumping, a cable attached at one end to one end of the scoop and over said lever bars, and stop members rising from said frame for cooperation with said lever bars.

In testimony whereof I hereunto affix my signature in the presence of two witnesses.

HARRY HIGHAM.

Witnesses:
H. M. P. DE ROCHE,
G. E. HUNT.